(12) United States Patent
Liao

(10) Patent No.: US 6,834,843 B2
(45) Date of Patent: Dec. 28, 2004

(54) APPARATUS FOR CONTROLLING CUTTING FLUID OF PROCESSING MACHINE

(76) Inventor: Lu-Chia Liao, No. 18, Fuan 7th St., Shituen Chiu, Taichung (TW)

( * ) Notice: Subject to any disclaimer, the term of this patent is extended or adjusted under 35 U.S.C. 154(b) by 200 days.

(21) Appl. No.: 10/314,236

(22) Filed: Dec. 9, 2002

(65) Prior Publication Data

US 2004/0108480 A1 Jun. 10, 2004

(51) Int. Cl.⁷ ............................................. F16K 31/02
(52) U.S. Cl. ........................... 251/129.04; 251/129.12; 83/169
(58) Field of Search ...................... 251/129.04, 129.12; 83/169

(56) References Cited

U.S. PATENT DOCUMENTS

| | | | | |
|---|---|---|---|---|
| 2,419,794 | A | * | 4/1947 | Roy et al. .................... 251/295 |
| 2,838,825 | A | * | 6/1958 | Knollenberg ................. 83/169 |
| 5,137,257 | A | * | 8/1992 | Tice ........................ 251/129.12 |
| 5,727,434 | A | * | 3/1998 | Dils et al. ...................... 83/169 |
| 6,044,857 | A | * | 4/2000 | Stege .................... 251/129.04 |
| 6,052,841 | A | * | 4/2000 | Mankin et al. ........ 251/129.12 |
| 6,279,870 | B1 | * | 8/2001 | Welz et al. ............ 251/129.04 |

* cited by examiner

*Primary Examiner*—John Bastianelli
(74) *Attorney, Agent, or Firm*—Bacon & Thomas PLLC

(57) ABSTRACT

An apparatus for controlling cutting fluid of a processing machine is disclosed to include a cylindrical rotor, a power source for driving said rotor to rotate, a control mechanism having an encoding device and a sensor, and a processor. The rotor has a main passage and a branch passage both in communication with a cutting fluid supply loop of the processing machine. The encoding device is fixedly mounted on the rotor. Once the sensor detects a code from the encoding device identical to a built-in control serial code of the processor when the processor orders the power source to drive the rotor to rotate based on the built-in control serial code, the power source is ordered by the processor to stop said rotor at a predetermined angle.

7 Claims, 7 Drawing Sheets

APPARATUS FOR CONTROLLING CUTTING FLUID OF PROCESSING MACHINE

FIELD OF THE INVENTION

The present invention relates generally to automatic processing machines, and more particularly to an apparatus for controlling cutting fluid of a processing machine.

BACKGROUND OF THE INVENTION

As shown in FIG. 1, a conventional general-purpose vertical processing machine is composed of a worktable 1 for fastening a workpiece 2 to be machined, a spindle head 3 fastened with a cutter 4 and driving the cutter 4 vertically to process the workpiece 2, a cutter storage 5 for receiving a plurality of cutters, and a switching arm 6 for switching the cutter 4, and a control device (not shown).

In operation, the control device (not shown) controls the vertical displacement of the cutter 4 and the horizontal displacement of the workpiece 2 by programs, thereby resulting in automatic processing and merchandise in precise size. Cutting fluid is supplied through a tube 7, which outlet faces a cutting end of the cutter 4 and a to-be-machined surface of the workpiece 2, for cooling the cutter and cleaning chips. However, when the workpiece 2 to be machined is varied in height or a cutting center is reset in light of switching a cutter, a position, at which the machined surface of the workpiece 2 is contacted by the cutting end of the cutter 4, is varied in height. Accordingly, a user has to reset the outlet of the tube 7 to face the position at which the cutting end of the cutter 4 and the machined surface of the workpiece 2 contact with each other, thereby resulting in effective cooling and cleaning. If the outlet of the tube 7 is not reset to face the aforesaid position in time, the cutter 4 will be easily damaged as a result of overheating while the cutter 4 and the workpiece 2 chafes with each other. Therefore, the user has to frequently stand by the processing machine to reset the tube 7 and the manpower is thereby wasted.

SUMMARY OF THE INVENTION

The primary objective of the present invention is to provide an apparatus for controlling cutting fluid of a processing machine, which is capable of automatically resetting an angle at which the cutting fluid spouts by control of logic programs.

The foregoing objective of the present invention is attained by the apparatus for controlling the cutting fluid of the processing machine. The apparatus is composed of a cylindrical rotor, a power source for driving said rotor to rotate, a control mechanism, and a processor. The rotor has a main passage inside extending along a longitudinal axle thereof and at least one branch passage in communication with the main passage. The main passage has an end in communication with a cutting fluid supply loop of the processing machine and the other end closed. The control mechanism has an encoding device and at least one sensor. The encoding device is mounted on the rotor and moves along with the rotor. The sensor is fixed at a fixed position corresponding to the encoding device. The processor has a built-in control serial code and is capable of ordering the power source to drive the rotor to rotate based on the built-in control serial code. Once the sensor detects a code from the encoding device identical to the built-in control serial code when the processor orders the power source to drive the rotor to rotate based on the built-in control serial code, the power source is ordered by the processor to stop said rotor at a predetermined angle corresponding to the built-in serial code.

DETAILED DESCRIPTION OF THE INVENTION

Figure 1:
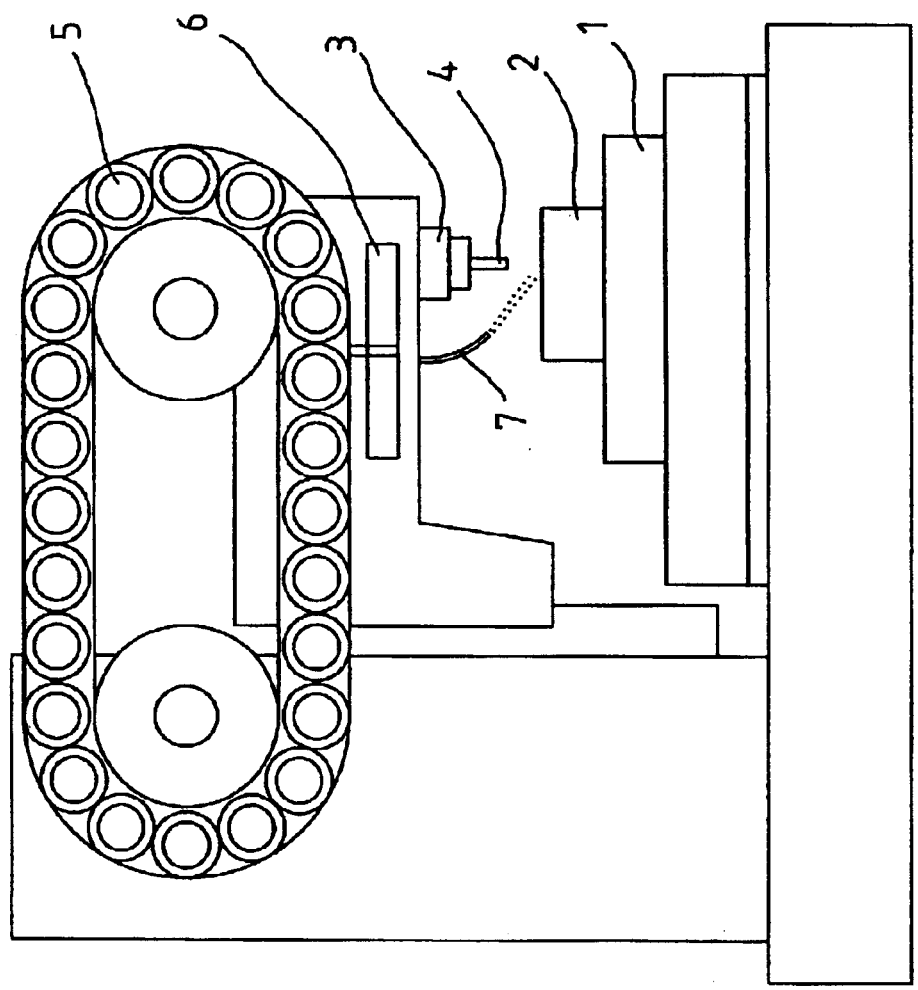
FIG. 1 is a schematic view of a conventional vertical general-purpose processing machine.
Figure 2:
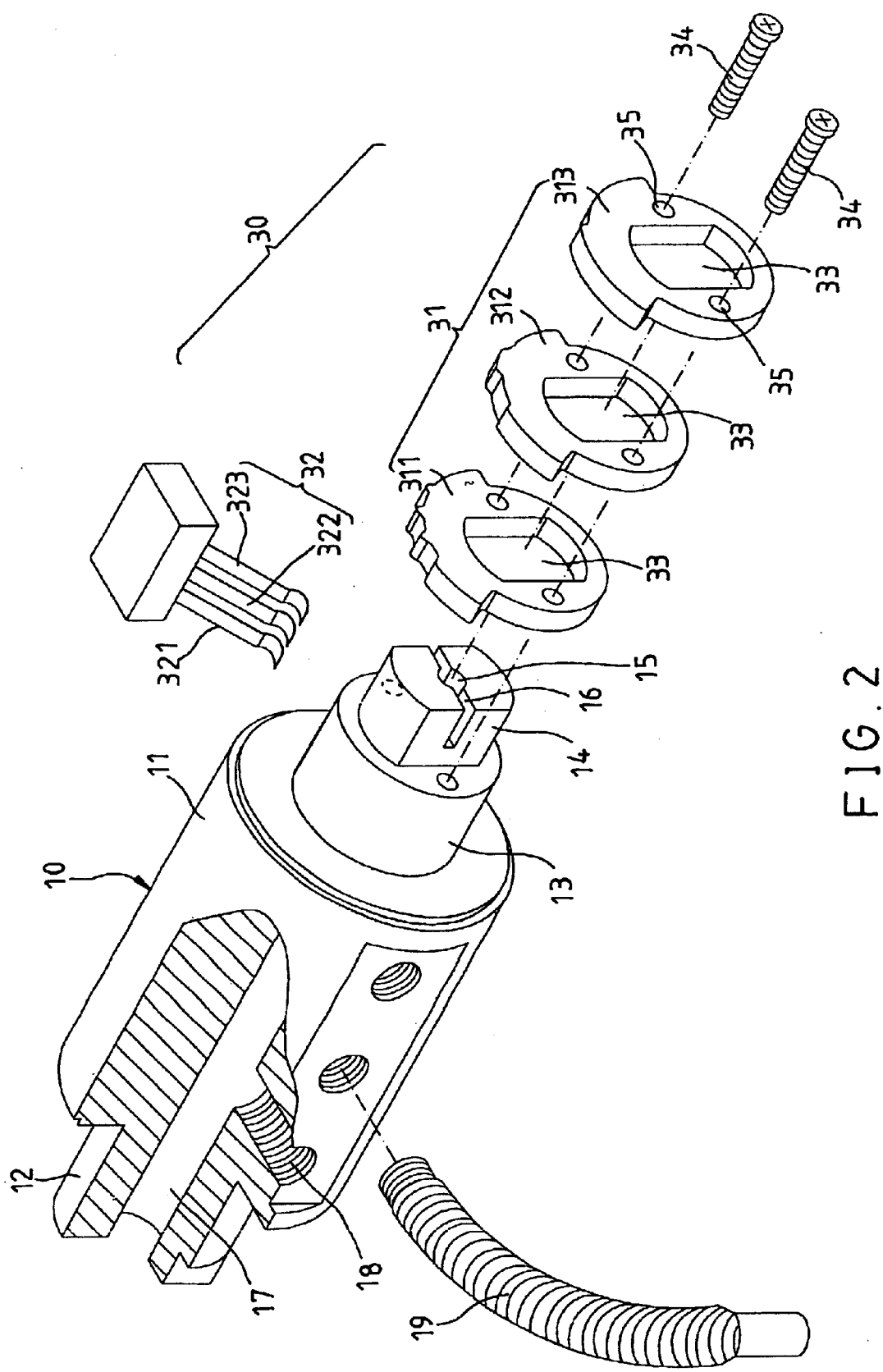
FIG. 2 is an exploded view of a first preferred embodiment of the present invention.
Figure 3:
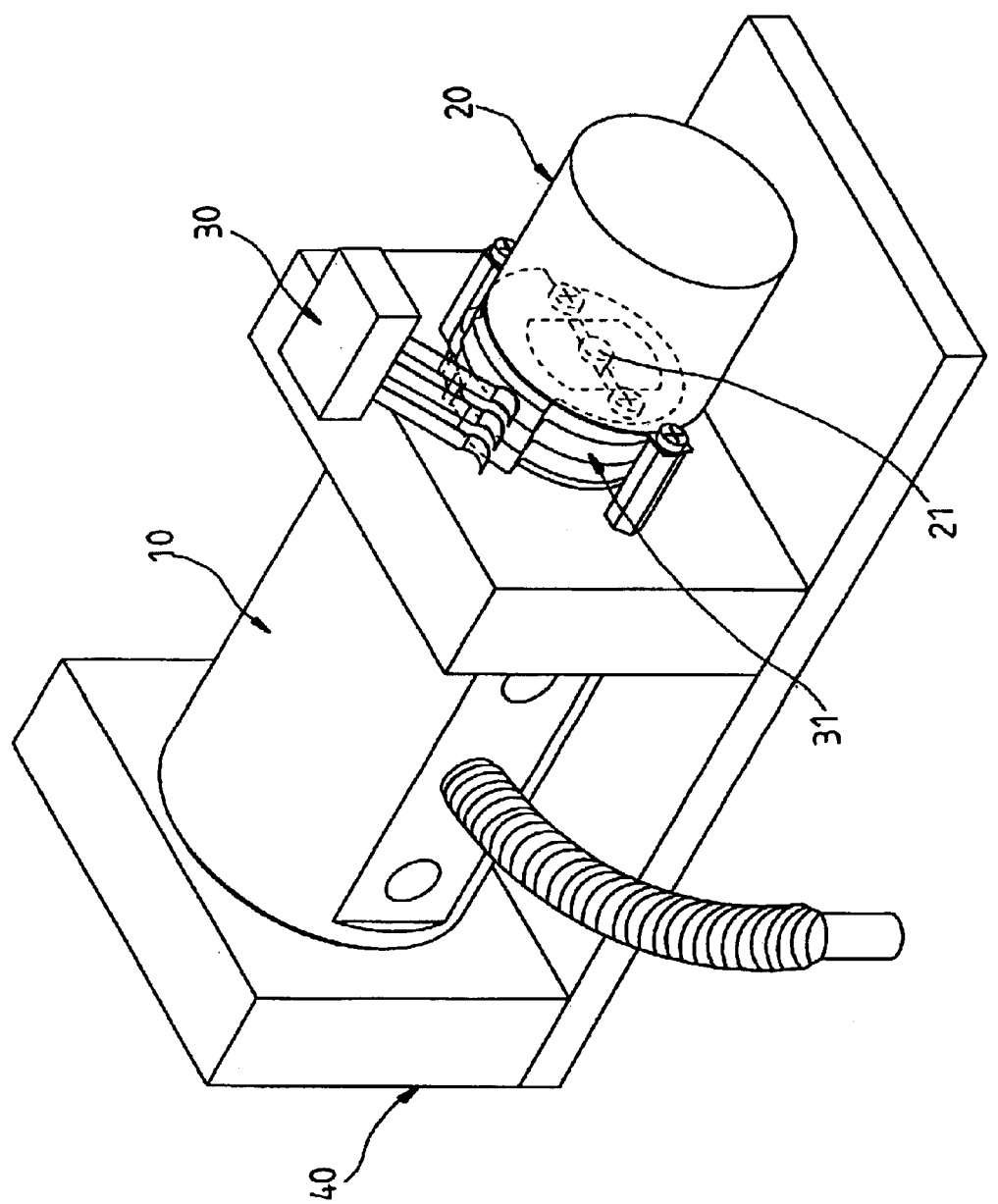
FIG. 3 is a perspective view of the first preferred embodiment of the present invention in combination.

Referring to FIGS. 2 and 3, an apparatus for controlling cutting fluid of a processing machine is provided by the present invention and is composed of a rotor 10, a motor 20 as a power source, a control mechanism 30, and a processor (not shown). The processor (not shown) is a programmable controller, which includes a plurality of built-in control programs and commands, such as a command of switching a cutter, a magnitude of displacement of the cutter or a workpiece, the cutting fluid being released or not, etc. The aforementioned functions of the processor are insignificant and will not be described in details thereafter.

The rotor 10 is cylindrical and includes a main body 11 at the middle section thereof and two extending rods 12 and 13 at two ends thereof. The main body 11 is greater in diameter than the extending rods 12, 13. The rotor 10 is pivotally mounted to a mounting base 40, which is fixed at a predetermined position of the processing machine, at the two extending rods 12 and 13. A coupling rod 14 having a non-rounded cross section protrudes from a front end of the extending rod 13 along a longitudinal axle of the rotor 10. The coupling rod 14 has an axial hole 15 and a groove 16. The rotor 10 is provided with a main passage 17 inside, which extends inward axially from an end of the extending rod 12 and is provided with a free end communicating with a cutting fluid supply loop and the other end closed without running through the rotor 10. The rotor 10 is radially provided with three holes, which respectively form a branch passage 18. The branch passage 18 is provided with an end communicating with outside and the other end communicating with the main passage 17 such that the cutting fluid can drain from the branch passage 18. Additionally, the main passage 18 can be coupled with a passage tube 19 to guide the cutting fluid.

The motor 20 is fixed to the mounting base 40 and is positioned at an exterior side of the closed end of the rotor 10, as shown in FIG. 3. The motor includes an arbor 21, which is provided with a protruding end received in the axial hole 15 of the coupling rod 14. The protruding end of the arbor is tightly received and engaged in the axial hole 15 by means of a lateral pin (not shown) passing through the protruding end and positioned in the groove 16 such that the rotor 10 is driven to rotate along with the arbor 21 of the motor 20 while the motor 20 is operated.

The control mechanism 30 is composed of an encoding device 31 and a sensor 32.

As shown in FIG. 2, the encoding device 31 includes three annular chunks 311, 312, 313, which are respectively provided with a through hole 33 and two locating holes 35. The through holes 33 are the same as one another in shape and in size and are also in the same shape as the cross-section of the coupling rod 14 such that the annular chunks can be coupled with the coupling rod 14. The annular chunks 311, 312, 313 are sequentially adjacently tightly coupled with the coupling rod 14 and are threadedly mounted on the rotor 10 by means of fasteners 34, which runs through the through holes 33 of the three annular chunks 311, 312, 313, and thereby the encoding device 31 rotates along with the rotor 10. Referring to FIG. 3, the encoding device 31 is mounted between a side of the mounting base 40 and the motor 20. Additionally, the annular chunks 311, 312, 313 are respectively provided with a protruding arced surface, which is formed of a plurality of erose portions. The erose portions, each of which is provided with a convexity and a concavity, are irregularly arranged on each of the annular chunks 311, 312, 313 so as to form predetermined encoding patterns.

The sensor 32 is fixed to the mounting base 40 and is in a position corresponding to the encoding device 31. The sensor 32 includes three sensing sheets 321, 322, 323, which extends outwardly from the sensor 32 and which distal ends respectively contact against the corresponding erose portions of the annular chunks 311, 312, 313. When the encoding device 31 rotates along with the rotor 10, the distal ends of the sensor 32 move up and down along with the erose portions of the annular chunks 311, 312, 313, and thereby the sensor 32 will generate a signal according to the movement of the distal ends of the sensor 32. For example, when a distal end of the sensor 32 respectively contacts against a high position (convexity) and a low position (concavity) of the erose portions of the annular chunk, the sensor 32 will respectively generate signals "0" and "1". And then the sensor 32 will transmit the signals to the processor.

The apparatus for controlling the cutting fluid of the processing machine of the present invention at work is described in details thereafter.

Figure 4:
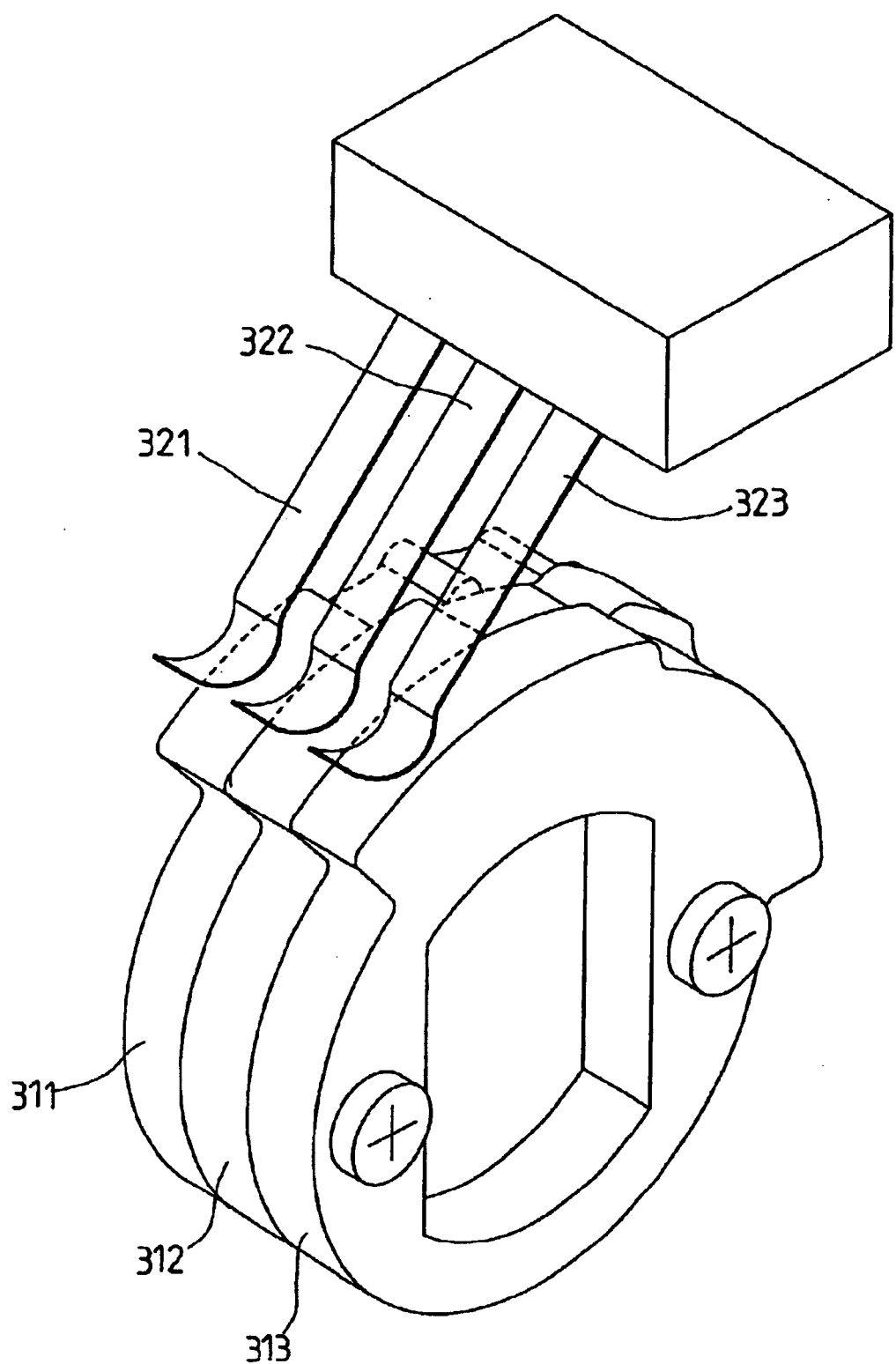
FIG. 4 is a schematic view of the first preferred embodiment of the present invention, showing that a first encoding pattern is generated.
Figure 5:
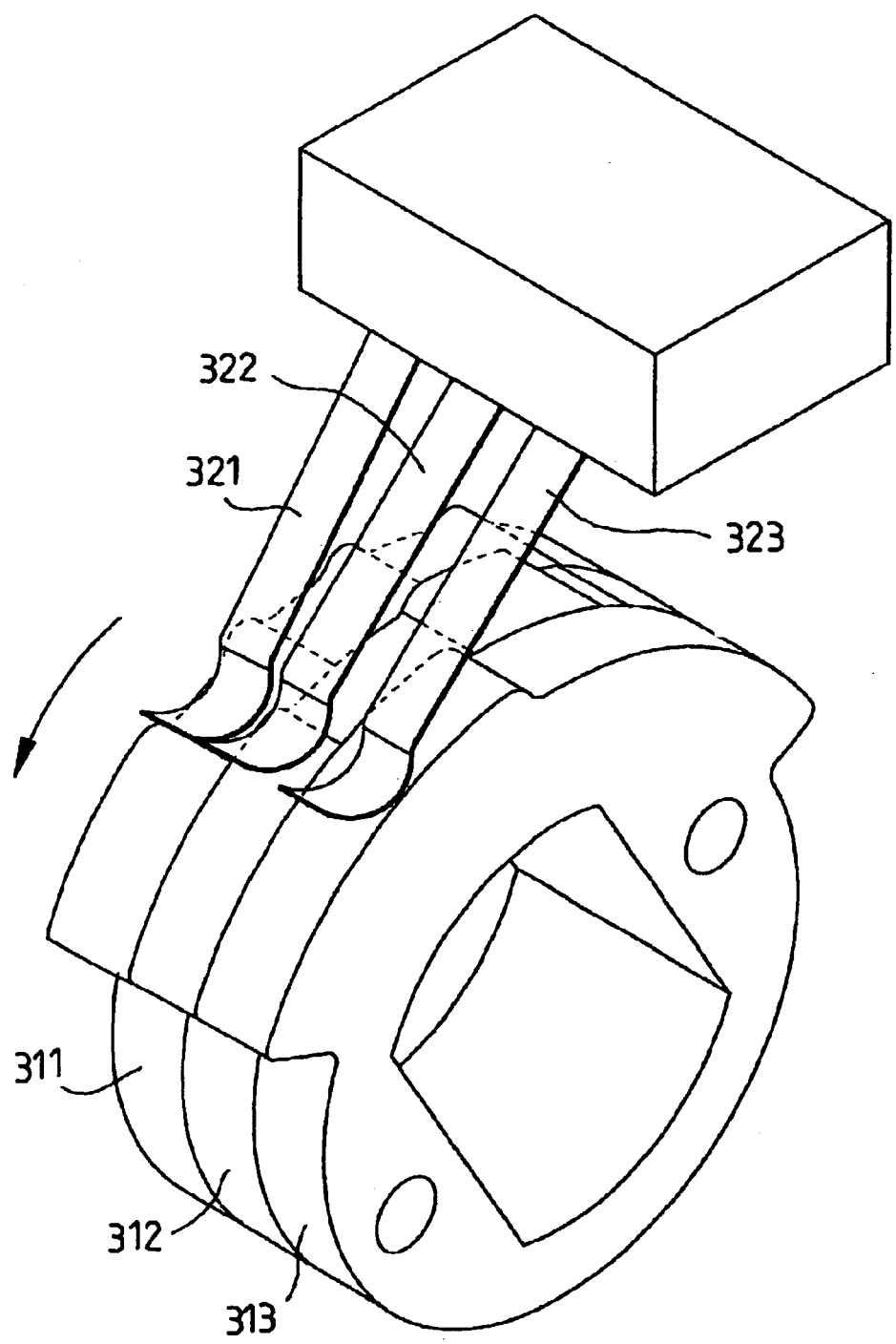
FIG. 5 is a schematic view of the first preferred embodiment of the present invention, showing that a second encoding pattern is generated.

Because the convexity and the concavity of the erose potions of each the annular chunk are irregularly positioned, the convexity and the concavity are alternately positioned when the three annular chunks 311, 312, 313 are positioned adjacently and tightly. Referring to FIG. 4, while the distal ends of the sensing sheets 321, 322, 323 of the sensor 32 respectively contact against front ends (smooth surface) of the erose portions of the annular chunks 311, 312, 313, the sensor 32 will generate an encoding pattern "0,0,0" and the rotor 10 will thereby stop at a predetermined position. While the rotor 10 rotates counterclockwise, a distal end of one sensing sheet will fall at a concavity and then the sensor 32 will generate another encoding pattern "0,0,1" and the rotor 10 will thereby stop to rotate and be positioned at another predetermined position, as shown in FIG. 5. While the rotor 10 keeps rotating, the sensor 32 will sequentially generate another encoding patterns "0,1,0", "0,1,1", "1,0,0", "1,0,1", "1,1,0", and "1,1,1". In other words, there are eight encoding patterns according to the arrangement of the erose portions of the annular chunks 311, 312, 313. Specifically, the rotor 10 is provided with a rotating magnitude of eight levels. Briefly, each time the rotor 10 rotates, each time the cutting fluid spouts at different angles. Accordingly, installing more annular chunks and sensing sheets will increase the levels of the rotating magnitude.

By means of the built-in control programs and commands of the processor, not only the cutter is maneuvered to process the workpiece, but also the rotor 10 is maneuvered to rotate by setting the control programs, such that the encoding device 31 moves and the sensor 32 thereby generates different encoding patterns. Once one of the encoding patterns matches a built-in control serial code provided by the processor when the processor orders the motor to drive the rotor to rotate based on the built-in control serial code, the motor will be ordered by the processor to stop the rotor 10 at a predetermined position corresponding to the built-in serial code such that the passage tube for transporting the cutting fluid will therewith stop to spout out the cutting fluid therethrough at a predetermined angle.

Therefore, the technical disclosure of the present invention lies in that the rotor 10 can be driven to rotate by control of the logic programs of the processor and then the cutting fluid can be automatically maneuvered to spout at different angles, such that the cutting fluid can be maneuvered to spout at different angles by control of the programs. Whenever the cutter is automatically switched or the workpiece is varied in height, the cutting fluid will spout on a machined surface between the cutter and the workpiece at any time so as to cool the cutter and clean chips at any time, and thereby the processing machine is preferably automated.

Figure 6:
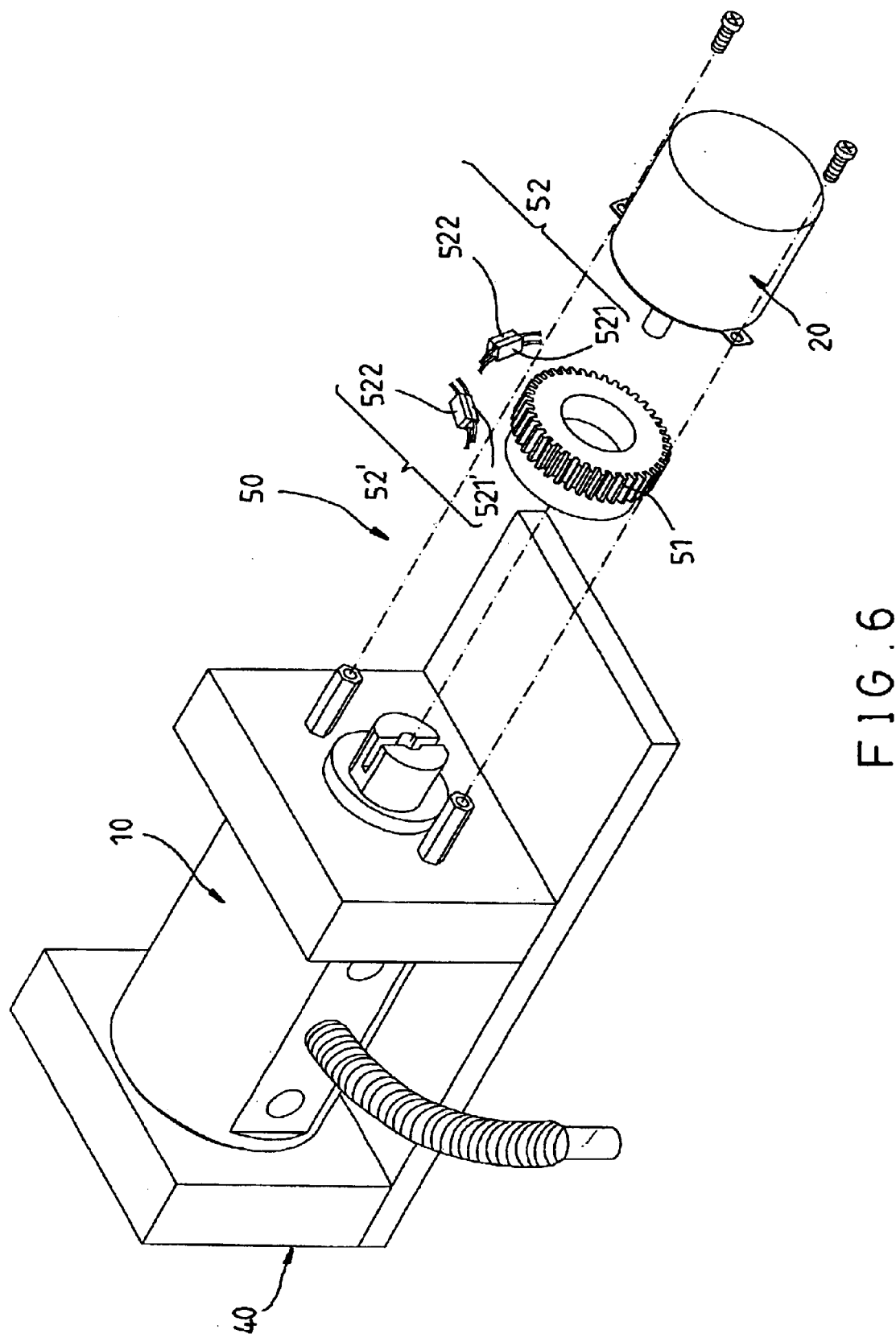
FIG. 6 is an exploded view of a second preferred embodiment of the present invention.

Alternatively, referring to FIG. 6, another preferred embodiment different from the foregoing preferred embodiment of the present invention lies in the way of detection of the control mechanism 50.

Figure 7:
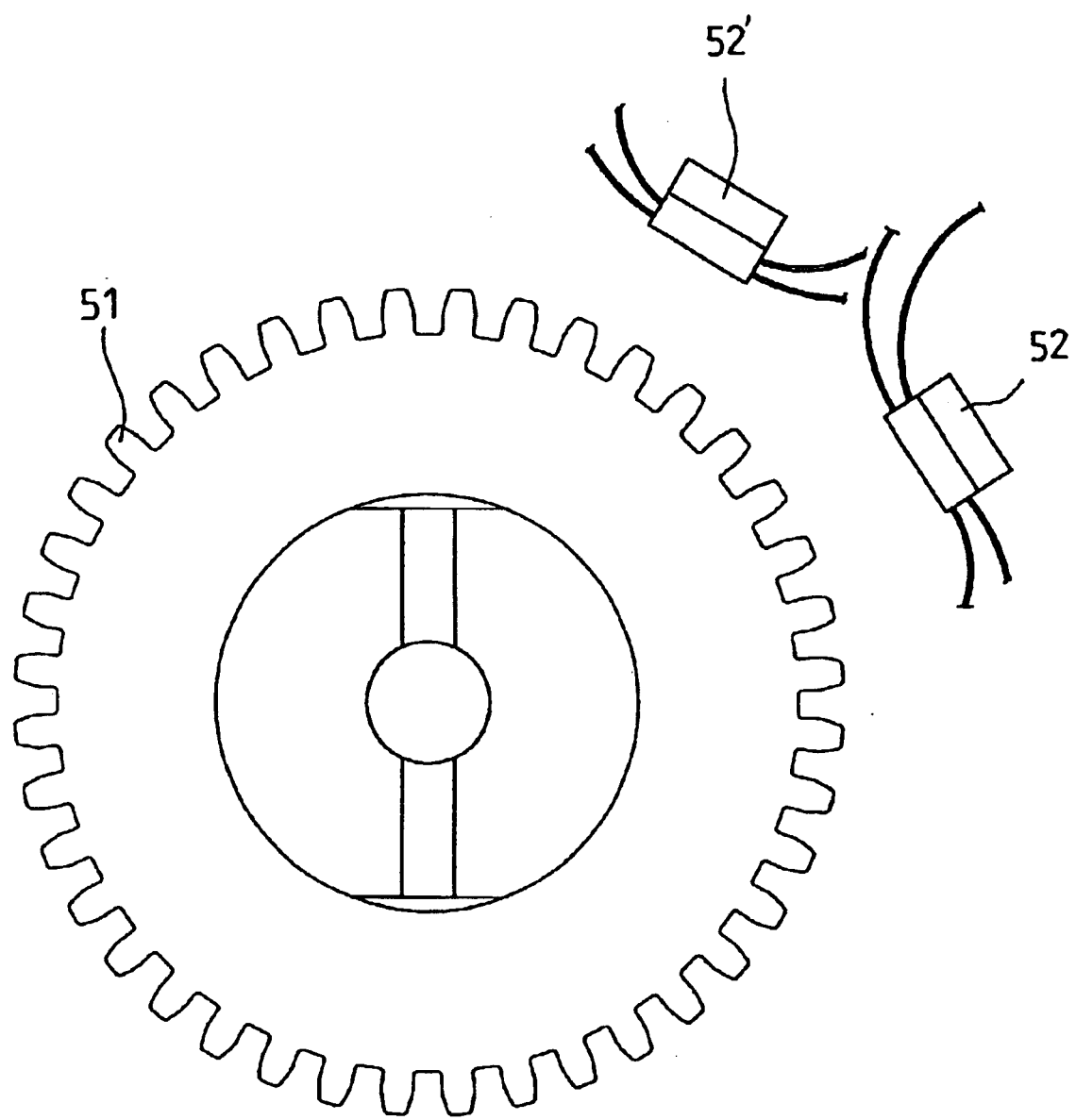
FIG. 7 is a schematic view of the second preferred embodiment of the present invention, showing how a sensor works.

The control mechanism 50 includes an encoding device 51 and two sensors 52. The encoding device 51 is a gear and is fixedly coupled with the coupling rod and between the mounting base 40 and the motor 20. The gear is driven to rotate by the rotor 10. The two sensors 52 and 52', each of which is a Hall sensor, are respectively provided with a receiving end 521(521') and a permanent magnet 522 at a rear side of the receiving end 521(521'). As shown in FIG. 7, the receiving ends 521 and 521' are respectively in different positions corresponding to the gear and are electrically connected with the processor. The two sensors 52 and 52' can detect the variation (magnetic flux) of potential difference between neighboring teeth of the gear to generate a signal of a level of the rotating magnitude. The signal will be transmitted via the receiving end 521(521') to the processor to be matched and processed as the same as the foregoing preferred embodiment. As a conclusion, the way of the foregoing magnetic detection can maneuver the rotor 10 to rotate at different angles, at which the cutting fluid is also maneuvered to spout at different angles. In addition, the gear is provided with a plurality of teeth such that the variation of the rotation of the rotor depends on the numbers of the teeth of the gear.

What is claimed is:

1. An apparatus for controlling cutting fluid of a processing machine having a cutting fluid supply loop, said apparatus comprising:

a cylindrical rotor having a main passage inside extending along a longitudinal axle thereof and at least one branch passage in communication with said main passage, said main passage having an end in communication with the cutting fluid supply loop and the other end closed;

a power source for driving said rotor to rotate;

a control mechanism having an encoding device and at least one sensor, said encoding device being mounted on said rotor and moving therewith, said sensor being fixed at a fixed position corresponding to said encoding device; and a processor having a built-in control serial code and being capable of ordering the power source to drive the rotor to rotate based on the built-in control serial code, once said sensor detecting a code from the encoding device identical to the built-in control serial code when the processor orders the power source to drive the rotor to rotate based on the built-in control serial code, the power source being ordered by the processor to stop said rotor at a predetermined angle corresponding to the built-in serial code.

2. The apparatus as defined in claim 1, wherein said encoding device comprises at least one annular surface provided with a plurality of erose portions and said sensor has at least one sensing sheet, said sensing sheet having a distal end contacting against said annular surface, said sensing sheet moving up and down along with said annular surface while said encoding device moves along with the rotor such that said sensor generates a signal and said rotor stops to move and is fixed at a position while the signal is identical to the built-in control serial code.

3. The apparatus as defined in claim 2, wherein said encoding device comprises at least two annular chunks, each said annular chunk having a through hole and mounted to said rotor; wherein said erose portions are positioned irregularly on each of said annular chunks; wherein said sensing sheets of said sensor are the same as said annular chunk in numbers and the distal end of each sensing sheet contacts against said erose portions of each said annular chunk.

4. The apparatus as defined in claim 1, wherein said branch passage of said rotor is coupled with a passage tube.

5. The apparatus as defined in claim 1, wherein said rotor is pivotally mounted to a mounting base at two ends thereof.

6. The apparatus as defined in claim 1, wherein said power source is a motor, said motor having an arbor provided with a protruding end fixedly connected with the closed end of said rotor.

7. The apparatus as defined in claim 1, wherein said encoding device is a gear fixedly connected with the closed end of said rotor; wherein said control mechanism comprises two said sensors each having a receiving end corresponding to said gear and electrically connected with said processor, and a permanent magnet provided at a rear side of the receiving end, said sensor detecting the potential difference between neighboring teeth of said gear for generating a signal and said signal being transmitted via said receiving end to said processor.

* * * * *